United States Patent Office 3,436,973
Patented Apr. 8, 1969

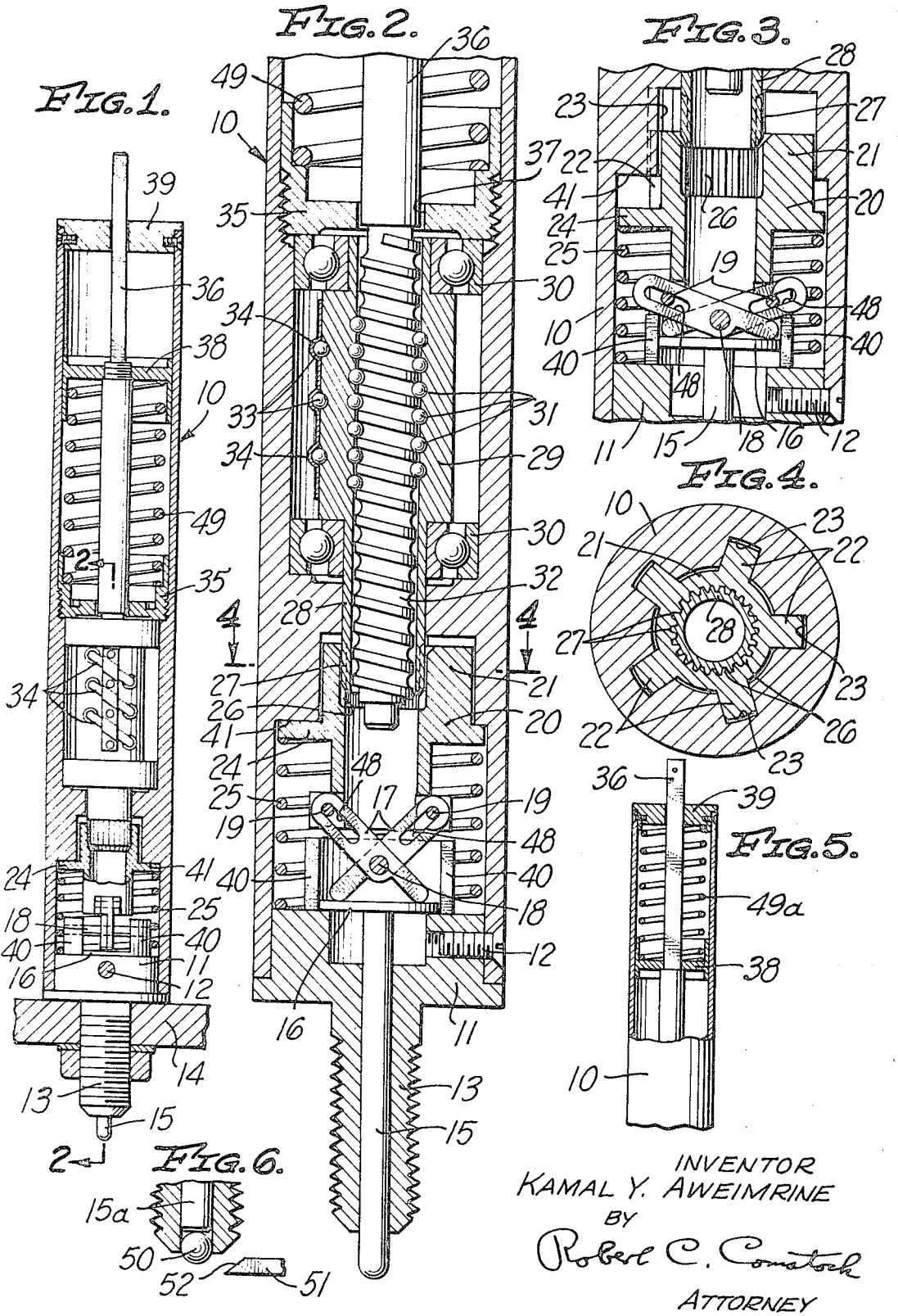

3,436,973
MECHANICAL LOCK CYLINDER
Kamal Y. Aweimrine, 4209 W. 1st St.,
Los Angeles, Calif. 90004
Filed June 19, 1967, Ser. No. 646,810
Int. Cl. F16h 29/20
U.S. Cl. 74—89.15    10 Claims

ABSTRACT OF THE DISCLOSURE

A mechanical lock cylinder which is particularly adapted for use in controlling the movement and positioning of aircraft or other vehicle seats, as well as for other uses. The cylinder provides linear adjustment by purely mechanical means and is self-locking at any and all points within its stroke limit.

Background of the invention

*Field of the invention.*—The invention relates to a mechanical lock cylinder which provides linear adjustment by purely mechanical means and which is self-locking at any and all points within its stroke limit. It is particularly adapted for use on vehicle seats.

*Description of the prior art.*—The only prior art devices known to the applicant which achieve a similar result are hydraulic, rather than mechanical. They are accordingly more costly to manufacture and service, and are less efficient and reliable in operation.

Summary of the invention

The invention relates to a mechanical lock cylinder which provides linear adjustment along the entire length of its stroke by purely mechanical means. It is also self-locking at any and all points along its stroke.

It has the capability to withstand high compression and tension loads. Its locking operation provides for minute or precise linear adjustment and provides an infinite number of possible linear adjustments within its range of movement.

It provides greater accuracy than hydraulic devices, as well as greater economy of original manufacture, improved reliability and ease and economy of maintenance, since no fluid flow or leakage problems are ever involved.

It is accordingly among the objects of the present invention to provide a mechanical lock cylinder having all of the advantages and benefits set forth above and following from the structure described hereinafter in this application.

My invention also comprises such other objects, advantages and capabilities as will later more fully appear and which are inherently possessed by my invention.

While I have shown herein preferred embodiments of my invention, it should be understood that the same are susceptible of modification and change without departing from the spirit of my invention.

Brief description of the drawing

FIG. 1 is a longitudinal sectional view of my device in use, with the shaft in partially inward position and the locking member in locked position;

FIG. 2 is an enlarged partial sectional view taken along line 2—2 of FIG. 1;

FIG. 3 is a partial sectional view similar to FIG. 2, showing the locking member in unlocked position;

FIG. 4 is a sectional view taken along line 4—4 of FIG. 2;

FIG. 5 is a partial sectional view on a reduced scale of the upper portion of an alternative embodiment of the invention, showing a tension spring instead of a compression spring;

FIG. 6 is an enlarged partial sectional view showing an alternative form of control for moving the push rod inwardly to release the locking member from engagement with the ball nut.

Description of the preferred embodiment

A preferred embodiment which has been selected to illustrate the invention is shown in FIGS. 1–4 of the drawings. It comprises an elongated tubular housing 10, one end of which is closed off by a plug 11. The plug 11 is held in place by one or more transversely directed screw 12. The outer end of the plug 11 comprises an externally screw threaded shank 13, which is adapted for threaded attachment to a member 14. The inner end of the plug includes a pair of spaced arcuate members 40.

Slidably extending through the plug 11 along the longitudinal axis thereof is an elongated push rod 15. The upper end of the push rod 15 is attached to one side of a transversely directed circular plate 16. The opposite side of the plate 16 engages one end of each of a pair of levers 17, which are pivotally mounted adjacent their midportions on a stationary bar 18 which extends transversely between and is supported by the arcuate members 40. The plate 16 is capable of longitudinal movement between the arcuate members 40.

The upper ends of both levers 17 are provided with elongated slots 48, which slidably fit around a pair of pins 19. The pins 19 are attached to one end of a locking member 20, which is mounted for sliding longitudinal movement within the housing 10. The end 21 of the locking member 20 which is remote from the pins 19 has a plurality of radial extensions 22 which are slidably mounted in complementarily formed recessed areas 23, as best shown in FIGS. 2 and 4 of the drawings. The locking member 20 is accordingly capable of moving linearly, but not of rotating.

The collar 24 engages a shoulder 41 formed on the interior of the housing 10 to limit the movement of the locking member 20 in response to urging from a coil spring 25, which extends between the collar 24 and the inner end of the plug 11.

The inner periphery of the end 21 of the locking member 20 is provided with a plurality of splines or corrugations 26 which extend into complementarily formed keyways or corrugations 27 carried by the outer periphery of the end of an elongated extension of a ball nut 29.

The ball nut 29 is rotatably journaled between a pair of spaced bearings 30. A screw 32 extends longitudinally through the ball nut 29. A plurality of ball bearings 31 are rotatably mounted in the threads of the screw 32 between it and the inner periphery of the ball nut 29. The outer periphery of the ball nut 29 engages a plurality of ball bearings 33, which travel along races 34.

An inverted collar 35 is screw threadedly mounted within the housing 10 adjacent to the bearing 30. An elongated shaft 36 extends outwardly from one end of the screw 32 freely through an opening 37 in the center of the collar 35. A transversely directed flange 38 is threadedly secured around the opposite end of the shaft 36, which continues outwardly through an opening in the center of a plug 39 which closes off the end of the housing 10.

The flange 38 is mounted for sliding (but not rotational) movement within the housing 10. The outer periphery of the flange 38 and the inner periphery of the housing 10 is preferably provided with splines or corrugations or other suitable means which permit longitudinal movement of the flange 38, while preventing rotational movement of the flange 38, shaft 36 and screw 32 with respect to the housing 10. A coil spring 49 extends between the flange 38 and the collar 35.

In operation, the coil spring 25 normally urges the locking member 20 toward the adjacent end of the ball nut 29, so that the corrugations 26 of the locking member 20 engage the corrugations 27 of the ball nut 29 to prevent rotational movement of the ball nut 29.

The ball nut 29 can be released for rotation by inward movement of the push rod 15 against the pressure of the coil spring 25. Such inward movement moves the plate 16 inwardly, causing the levers 17 to pivot on the bar 18. As the lower ends of the levers 17 are moved inwardly by the plate 16, their upper ends are pulled outwardly, thus pulling the locking member 20 outwardly by pressure exerted on the pins 19, which move along the slots 48 in the levers 17.

The locked position of the device is shown in the lower part of FIG. 2 of the drawings, while the unlocked position is shown in FIG. 3 of the drawing.

When the ball nut 29 is free from engagement with the locking member 20, it is free to rotate in either direction. If the shaft 36 is moved inwardly by force exerted upon it, or upon a member to which it is attached or engaged, the flange 38 is moved inwardly against the pressure of the coil spring 49. Since the screw 32 to which the shaft 36 is attached cannot rotate, the inward pressure causes inward rotational movement of the ball nut 29 which permits longitudinal movement of the shaft 36 and screw 32.

On the other hand, if the spring 49 is in partially compressed position, as shown in FIG. 1 of the drawings, and the pressure against the shaft 36 is less than that exerted by the spring 49 when the locking member 20 is released, the movement will be in the opposite direction. The pressure from the coil spring 49 will urge the flange 38 outwardly. The resulting outward pressure on the shaft 36 will cause the ball nut 29 to rotate in the opposite direction to permit the screw 32 and shaft 36 to move outwardly.

When the pressure on the push rod 15 is released, the coil spring 25 will immediately move the locking member 20 back into engagement with the adjacent end of the extension 28 of the ball nut 29, and the device will be locked against further movement in either direction.

It should be noted that the locking action can take place at any time and at any position of the shaft 36 and screw 32. It is accordingly possible to lock the device in any position whatsover which may be desired.

It should also be noted that outward movement of the shaft 36 is automatic whenever the shaft 36 is subjected to less pressure than that exerted by the coil spring 49 at the time the locking member 20 is released.

Movement of the shaft 36 in an inward direction accordingly requires first a release of the locking member 20 by inward movement of the push rod 15, followed by pressure on the shaft 36 in an amount greater than that exerted by the coil spring 49.

Movement of the shaft 36 in an outward direction occurs automatically upon release of the locking member 20 by inward movement of the push rod 15, if the pressure on the shaft 36 is less than that exerted by the coil spring 49.

Locking occurs immediately and automatically in any position of the shaft 36, upon the release of pressure on the push rod 15.

If the device is used for a movable seat back, the shaft 36 is preferably attached to the seat back in a manner which prevents the shaft 36 from rotating. The housing 10 is attached to a stationary member or a member with respect to which the seat back is to be moved. The seat back can then be moved to any desired position and can be automatically locked in such position. The seat back is automatically held in any desired position until pressure is exerted on the push rod 15 to release the locking member 20. The seat back can then be moved in one direction by exerting pressure on the seat back or in the opposite direction by releasing the seat back from pressure.

FIG. 5 of the drawings shows an alternative embodiment of the invention in which an alternative coil spring 49a is disposed between and attached to the plug 39 and the flange 38. The spring 49a is held under tension, rather than compression, and its tension normally tends to move the flange 38 in an outward direction, in the same manner as the compression of the coil spring 49.

FIG. 6 of the drawings shows an alternative embodiment of control for the push rod in which a push rod 15a has its inward movement controlled by a ball 50. An operating member 51 has an angularly directed cam surface 52. Upon lateral movement of the operating member 51, the cam surface 52 engages the ball 50 and moves it inwardly, thus moving the push rod inwardly to release the locking member 20. Inward movement of the push rod 15a is accordingly achieved by a transverse rather than a linear movement. The amount of movement required to release the locking member 20 would obviously have to be commensurate with the inward movement of the push rod 15a in response to the pressure exerted upon it by the ball 50, or a solenoid or similar device would be used to augment the distance of movement.

It will be readily apparent that a ball nut need not necessarily be used and that a conventional nut and screw may also be used. In such case, the friction is somewhat greater, so that the efficiency of the device is slightly reduced, but the device will otherwise operate in the same manner described above and illustrated in the drawings.

I claim:

1. A mechanical lock cylinder comprising a housing, a nut rotatably mounted within said housing, a screw mounted within said nut, means permitting longitudinal movement of said screw with respect to said nut and housing while preventing rotational movement of said screw with respect to said nut and housing, locking means adapted to prevent the rotation of said nut, a shaft attached to one end of said screw, resilient means normally urging said shaft outwardly with respect to said housing, said nut being rotatable upon the release of said locking means, said nut rotating in one direction to permit the movement of said screw and shaft in one linear direction in response to pressure exerted upon said shaft by said resilient means, said nut rotating in the opposite direction to permit movement of said screw and shaft in the opposite linear direction in respect to pressure exerted on said shaft in excess of the pressure exerted by said resilient means, said nut and screw comprising a ball nut and screw, in which a plurality of ball bearings are mounted in the threads of said screw between the outer periphery of said screw and the inner periphery of said nut.

2. The structure described in claim 1, said locking means comprising a locking member having means engageable with complementarily formed means on said nut, second resilient means normally urging said locking member into a position wherein said locking member is in locking engagement with said nut, and means for moving said locking member out of said locked position against the urging of said second resilient means.

3. The structure described in claim 2, and a push rod moveable inwardly through the end of said housing remote from said shaft to control the locking movement of said locking member.

4. The structure described in claim 3, in which the inner end of said locking member has a plurality of currugations engageable with complementary corrugations on the end of said nut remote from said shaft, the other end of said locking member having a pair of pins, a pair of levers having slots formed in the inner ends thereof surrounding said pins, both of said levers being pivotally mounted between their ends on a fixed axis, and means connected to said push rod and engagable with the outer ends of said levers to control the movement of said locking member through the movement of said levers.

5. The structure described in claim 4, said second resilient means comprising a coil spring mounted between said locking member and the adjacent end of said housing surrounding said levers, said housing having a shoulder limiting the inward movement of said locking member in response to the urging of said spring.

6. The structure described in claim 2, and a collar mounted within said housing directly above said nut, said collar being free from attachment to said shaft, and a transverse flange slidably mounted within said housing above said collar, said flange being attached to said shaft, said first resilient means comprising an elongated coil spring mounted between said flange and said collar.

7. The structure described in claim 3, and a flange extending transversely across said housing outwardly from said nut, said flange being attached to said shaft, said first resilient means comprising an elongated coil spring attached to said flange and to the outer end of said housing.

8. The structure described in claim 3, and a ball mounted in rotatable engagement with the outer end of said push rod, and a control member having a cam surface engageable with said ball upon lateral movement of said control member to move said ball inwardly to effect inward movement of said push rod.

9. The structure described in claim 3, said second resilient means comprising a coil spring mounted between said locking member and the adjacent end of said housing surrounding said levers, said housing having a shoulder limiting the inward movement of said locking member in response to the urging of said spring.

10. The structure described in claim 3, in which the inner end of said locking member has a plurality of corrugations engagable with complementary corrugations on the end of said nut remote from said shaft.

References Cited

UNITED STATES PATENTS

| | | | |
|---|---|---|---|
| 2,579,305 | 12/1951 | Cushman | 297—361 |
| 3,127,788 | 4/1964 | Martens | 74—586 |
| 3,269,199 | 8/1966 | Deehan et al. | 74—89.15 |

FRED C. MATTERN, JR., *Primary Examiner.*

F. D. SHOEMAKER, *Assistant Examiner.*

U.S. Cl. X.R.

74—424.8